April 12, 1927.

J. P. DERRICK

PLOWING DEVICE

Filed April 24, 1925

1,624,041

Inventor
John P. Derrick
By D. Swift
Attorney

Patented Apr. 12, 1927.

1,624,041

UNITED STATES PATENT OFFICE.

JOHN P. DERRICK, OF CARMINE, TEXAS.

PLOWING DEVICE.

Application filed April 24, 1925. Serial No. 25,543.

The invention relates to a wheel supported plowing device, to which device a conventional form of plow may be easily and quickly attached in a manner whereby the plow as the wheel supported frame moves forwardly, may be manipulated by an operator in a manner whereby said plow may be tilted longitudinally or transversely for simulating the manual manipulation of the plow under normal conditions, but at the same time allowing the plow to be horse drawn and the operator to ride on the device.

A further object is to provide a plowing device comprising a wheel supported frame, under which a conventional form of beam plow is disposed in a position whereby the rearward and upwardly extending handles of the plow will be disposed adjacent a seat on the frame, and to provide a flexible connection between a double tree carried by the forward end of the plow beam and the traces leading to draught animals, thereby placing the draught of the plow on the draught animals. Also to provide lever means controllable from the operator's seat for tilting the plow beam in a vertical longitudinal plane.

A further object is to provide the handles of the plow with brackets adapted to be engaged by the feet of the operator, whereby the operator may utilize his feet for assisting in controlling and guiding the plow.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
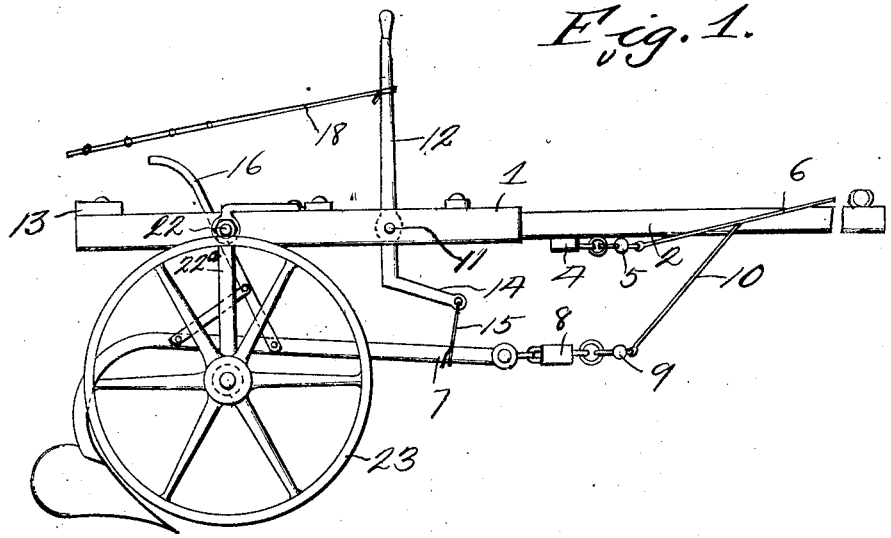
Figure 1 is a side elevation of the device.
Figure 2:
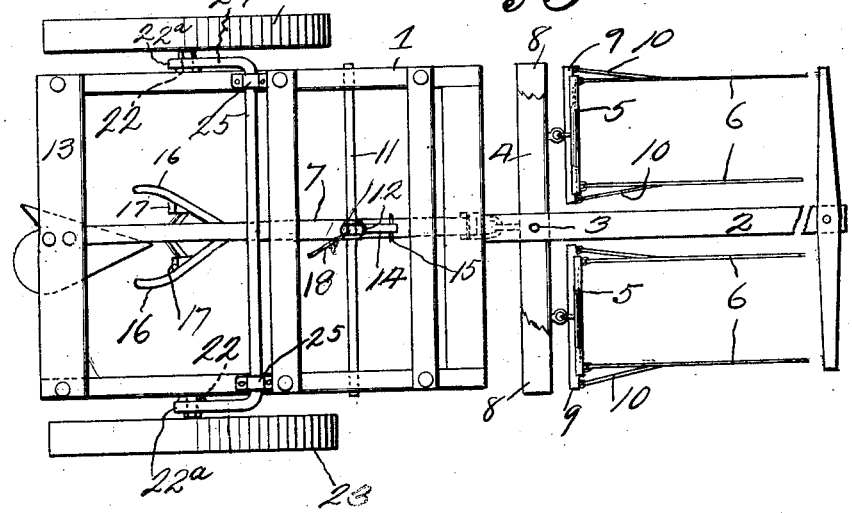
Figure 2 is a top plan view of the device.

Referring to the drawing the numeral 1 designates a rectangularly shaped horizontally disposed frame and 2 a forwardly extending tongue carried thereby. Pivotally connected to the tongue 2 at 3 is a double tree 4, to which double tree single trees 5 are connected, and to the single trees are connected traces 6, which are adapted to be disposed at opposite sides of draught animals. Disposed beneath the frame 1 is the beam 7 of a conventional form of hand plow, and to the forward end of which is connected a double tree 8 disposed below the first mentioned double tree 4, and to the double tree 8 single trees 9 are connected which single trees are provided with flexible connections 10 with the traces 6, therefore it will be seen that as draft animals move forwardly a draft will be applied to the plow beam 9. Pivotally mounted, preferably on a cross bar 11 of the frame 1 is a vertically disposed lever 12, which lever is adapted to be grasped by the operator while seated on the seat for raising and lowering the forward end of the plow beam 9 during the plowing operation. The lower end of the lever 12 is provided with an arm 14, which arm is provided with a flexible connection 15 with the plow beam. The plow beam 9 adjacent its rear end is provided with conventional diverging upwardly and rearwardly extending handles 16, which handles terminate adjacent the seat 13 above the frame 1 where they can be easily gripped by the operator for manipulating the plow. Handles 16 are provided with foot engaging brackets 17, on which the operator places his feet for assisting in the manipulation of the plow. The lever 12 is provided with a rearwardly extending flexible member 18 adapted to be grasped by the operator for controlling the movement of the lever 12, therefore it will be seen that the entire plow may be controlled by the operator from the seat 13, and the operator may easily manipulate the plow for simulating a conventional form of plowing operation and at the same time use a conventional form of plow without the disadvantage of walking behind the plow.

Connected at 22 at opposite sides of the frame 1 are downwardly extending arms 22[a], on the lower ends of which are mounted wheels 23 on which the device moves over the ground. The upper ends of the arms 22[a] terminate in a horizontally disposed U-shaped member 24, which engages the upper side of the frame 1 and is secured to the upper side of the frame by means of cleats 25, therefore it will be seen that arms 22[a] and the U-shaped member 24 are formed from a single piece of material.

From the above it will be seen that a plowing device is provided, to which a conventional form of plow may be easily and quickly attached, and the plow can be easily controlled by the operator while riding on the device.

The invention having been set forth what is claimed as new and useful is:—

The combination with a wheel supported frame, draft means carried by said frame and including traces, of a plow disposed below said frame and between the wheels thereof, a double tree connected to the forward end of the plow, single trees carried by said double tree, flexible connections between the single trees and the traces, a lever carried by the wheel supported frame, a flexible connection between said lever and the plow adjacent its forward end, a seat carried by the rear end of the frame, said plow being provided with upwardly extending handle members extending through the frame and terminating adjacent the seat, said handle members in combination with the weight of the forward end of the plow and the double tree forming means whereby said plow may be controlled during a plowing operation.

In testimony whereof I have signed my name to this specification.

JOHN P. $\overset{\text{his}}{\times}$ DERRICK.
$\phantom{\text{JOHN P. }}$ mark